UNITED STATES PATENT OFFICE.

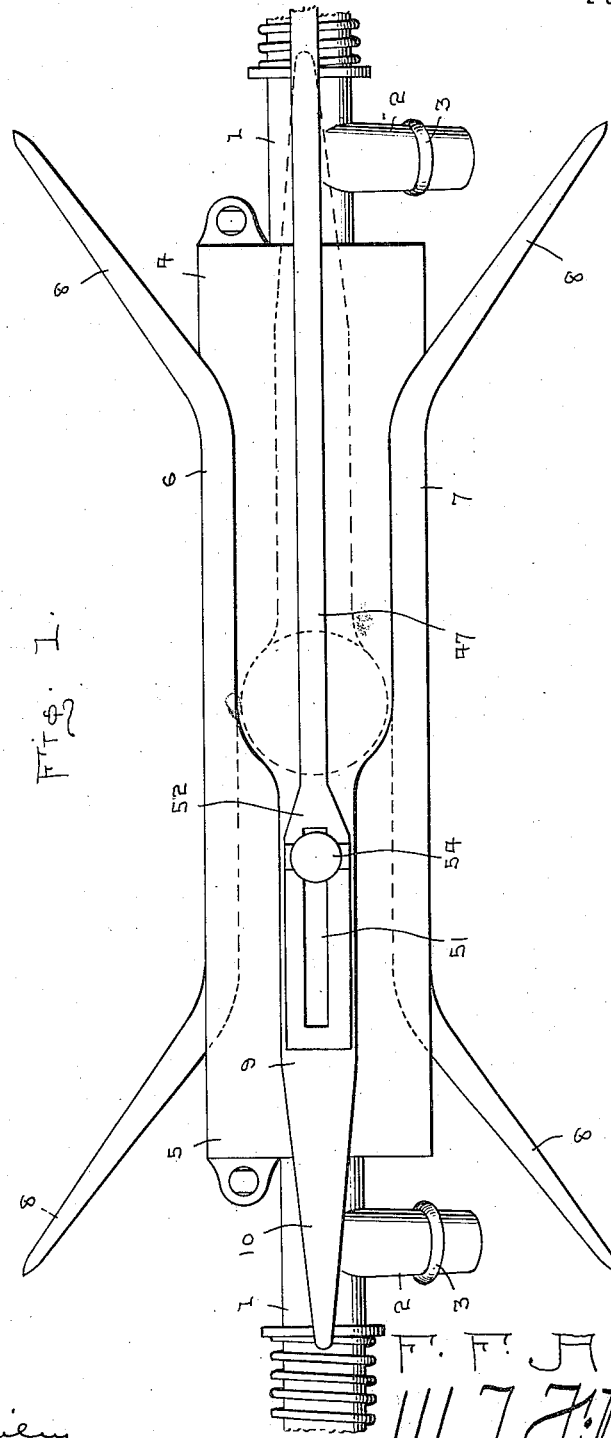

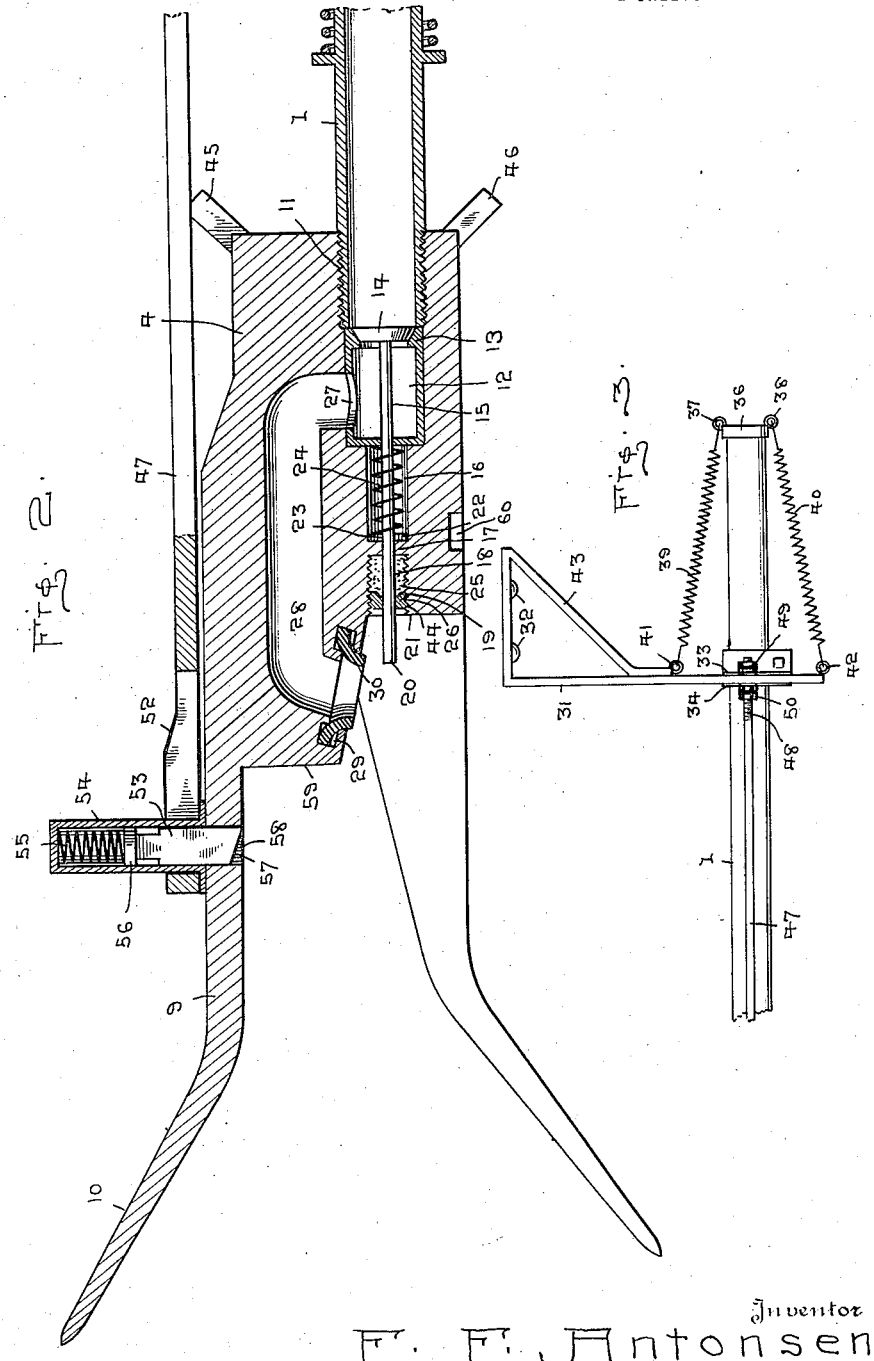

FRED F. ANTONSEN, OF BUFFALO LAKE, MINNESOTA.

TRAIN-PIPE COUPLING.

1,174,797.

Specification of Letters Patent.

Patented Mar. 7, 1916.

Application filed April 20, 1914. Serial No. 833,272.

*To all whom it may concern:*

Be it known that I, FRED F. ANTONSEN, a citizen of the United States, residing at Buffalo Lake, in the county of Renville and State of Minnesota, have invented certain new and useful Improvements in Train-Pipe Couplings; and I do hereby declare the following specification to be a full, clear, and exact description of the invention, such as will enable others skilled in the art to which it appertains to make and use the same.

This invention relates to train pipe couplers of the automatic type.

One of the principal objects of this invention is to provide an automatic device whereby a train pipe coupling can be operated upon cars of unequal height.

A still further object of this invention is to provide a coupler whereby one member operates the valve of the other member. And still another object of this invention is to provide an arrangement whereby the leakage of air through the valve chamber is prevented.

Other objects and advantages of this invention will be hereinafter more fully described in the specification and pointed out in the claims.

Similar characters of reference refer to similar parts throughout the specification and drawings, in which, Figure 1 is a side view of my device. Fig. 2 is a horizontal sectional view, and, Fig. 3 is a detail view of an adjustable supporting device for the structure.

In Fig. 1 of the drawings, 1 is a hollow draw bar combined to act as an air feed, the air being received through the connection 2, which is provided with an annular flange or corrugation 3 therearound adapted to insure the sealing of an ordinary air hose mounted thereover and adapted to feed air to this structure. The couplers proper are composed of the interlocking members 4 and 5, said members being substantially of like construction having the two parallel arms 6 and 7, each arm having a bent portion 8, said bent portion being outwardly and oppositely disposed to act as guides to the insertion of the opposite member and said arms 6 and 7 being positioned to one side of the longitudinal center of said coupling. A third arm 9 projects from each locking member. The two arms project from top and bottom, while this third arm projects from the side, and has a like bent portion 10 which combines with the bent portions 8 to act as a guide for the insertion of the opposing coupling member. Each of these arms is wedge shaped as it projects outwardly and is seated in a suitable offset portion of the opposing coupling member which likewise is wedge shaped, this wedge shape construction assisting in seating and guiding each coupling member to its seat.

The hollow draw bar 1 is suitably threaded as at 11 in a coupling member, and in the instance shown in Fig. 2, being threaded in the coupling member 4. This hollow draw bar communicates with the air chamber 12 seated at the end of the member 1, said air chamber having an angular beveled flange 13 at the end thereof adapted to seat a valve 14 this valve having a rod 15 projecting through said air chamber through a second chamber 16 through an annular collar 17, a third chamber 18 and a sealing cap or nut 19, said rod 15 ending at 20 at a point somewhat extended from the wall 21. A suitable collar 22 is rigidly fastened as at 23 to the rod 15.

A coil spring 24 is mounted upon the rod 15 between the end of the air chamber 12 and the collar 22 and is adapted to be compressed when said valve is open and to reseat said valve when the same is not in use thereby cutting off the supply of air through said coupling members. As a means to prevent the air leaking past the rod 15, a suitable packing 25 is compressed in the chamber 18 and locked therein by means of a nut or cap 19 which is threaded as at 26 for this purpose. The air chamber 12 has a vent 27 of the same diameter as the U-shaped duct 28 allowing the air which enters the chamber 12 to pass therethrough. A suitable annular recess 29 preferably of squared formation is formed at the end of the duct 28 in which is suitably mounted an air sealing gasket 30. The face wall of each coupling member at the outer end of the U-shape duct is inclined or tapered so that when the two coupling members are brought together, a substantially air tight passage will be formed in view of the fact that the gaskets 30 are cup-shape and have their free ends projecting slightly beyond the inclined faces so that they will press against each other when the coupling members are properly secured together. In view of the inclination of the end walls, said gasket members will not be injured when the couplers are connected together or disengaged from each other.

A suitable supporting bracket 31 is mounted by means of fastening devices 32 to the under portion of the car and is adapted to support the end of the hollow draw bar 1, said draw bar passing through a suitable aperture in said bracket 31 and is adjusted in position by means of clamping plates 33 and 34 on opposite sides of the bracket, this arrangement allowing the adjusted clamping of the draw bar 1 in a desired position within the confines of the apertures, thereby allowing the use of this structure on cars of unequal height.

A collar 36 is mounted upon the end of the draw bar 1 having suitable eyelets 37 and 38 therein adapted to receive the end of the coil springs 39 and 40, the opposite ends of which are fastened to eyelets 41 and 42 respectively, these last mentioned eyelets being mounted in the bracket 31. Said springs 39 and 40 operate to center the draw bar 1 as well as to extend said draw bar outwardly. As additional means of safety, a bracing member 43 is positioned between the upper arms 44 of the member 31 and the member 31 itself as clearly shown in Fig. 3. The springs 39 and 40 also assist to absorb the jar received druing the coupling of this structure.

Projecting eyelet members 45 and 46 are had upon the inner end of each coupling member and adapted to receive the ends of suitable coil springs (not shown), the opposite ends of which are fastened to the ends of the cars near the side, said last mentioned arrangement likewise assisting to center the coupling members. An operating bar 47 is mounted upon the side of the coupling member, the inner end of which is suitably threaded as at 48 and passes through a suitable aperture in the bracket 31, said operating bar being clamped to said bracket by means of nuts 49 and 50 mounted upon the threaded end of said bar. The opposite end of the bar 47 is slotted as at 51 and wedge shaped as at 52 and is adapted to operate a locking dog 53, said dog being mounted within a suitable casing 54 and held in locked position by means of a coil spring 55, said coil spring being mounted in the upper end of said casing and playing upon the head 56 of the locking dog 53, the opposite end of the locking dog being beveled as at 57 and playing through suitable apertures 58 in the member 9 to lock in a suitable recess 60 formed in the opposing member 5.

In operation, the coupling members 4 and 5, each having previously been mounted on a car and adjusted to center with the coupling member of the opposite car, each coupling member being of like formation, are brought together. The projecting portion 59 of one member seats against the face 21 of the opposite member and the gaskets 30 abut, thereby sealing the passage of air through said coupling members. Said coupling members are guided by means of the bent portions 8 and 10 of the projections 6, 7 and 9 and centrally by means of said wedge shaped projections as previously described. Concurrently with the above, the heads 20 of the rods 15 engage the projections 59 of the respective couplers and move the rods lengthwise to unseat the valves 14 from the annular flanges 13, thereby allowing the air to freely pass through said device. When the valves 14 are seated in the annular flange 13 they prevent leakage therefrom when the devices are uncoupled.

Having thus fully described my invention what I claim as new and desire to secure by Letters Patent of the United States, is:—

1. A train pipe coupler comprising two like interlocking coupling members hollow at one end, each having a substantially U-shape duct, an air chamber seated in the hollow portion of each coupling member, said air chamber inclosed at one end and having a vent communicating with the U-shape duct, a valve seat at the open end of the air chamber, a valve coöperating with said seat, a rod connected to said valve and extending through and beyond the wall of the coupling member in position to be engaged and operated by the other coupling member, a second chamber in the coupling member, an integral collar at one end of said chamber, a spring surrounding said valve rod between the collar and the closed end of the air chamber, a packing means for said valve rod, and means for centering the coupling members relative to each other.

2. A train pipe coupler comprising a pair of coupling members hollow a portion of their length, the forward end of each coupling member having a pair of parallel arms, each arm being at the edge of the coupling member and spaced apart, the free ends of said arms being bent outwardly to form guides, a single arm at the edge of the coupling member opposite that occupied by the pair of arms and at the axial center thereof, the free end of the single arm being tapered and bent outwardly, a substantially U-shape duct through the body of the coupling member, the wall at the outer end of the duct being inclined to coöperate with the inclined wall of the other coupling member, means at the meeting ends of the ducts to maintain an air tight passage, an air chamber seated in the hollow portion of each member, one end of the chamber being open and the other end closed, said chamber having a vent in the side wall thereof communicating with one end of said duct, and an automatically operated valve to control the passage of air through said chamber and duct.

In testimony whereof I have hereunto set my hand in the presence of two subscribing witnesses.

FRED F. ANTONSEN.

Witnesses:
R. E. BURGSTAHLER,
F. G. NELLERMOE.